United States Patent [19]

Gerrand

[11] 4,302,872
[45] Dec. 1, 1981

[54] METHOD OF MAKING WHEELS, PULLEYS AND TUMBLERS

[76] Inventor: Henry J. F. Gerrand, 25 Haldane St., Beaumaris, Victoria, Australia, 3193

[21] Appl. No.: 57,416

[22] Filed: Jul. 13, 1979

[30] Foreign Application Priority Data

Jul. 24, 1978 [AU] Australia ............................... PD5196

[51] Int. Cl.³ ........................ B21D 53/26; B60B 1/04; B60B 1/14; B60B 25/00
[52] U.S. Cl. ............................. 29/159.03; 29/159.02; 29/159.01; 29/159 R; 474/141; 474/195; 301/5 R; 301/31
[58] Field of Search ............ 29/159 R, 159 B, 159.01, 29/159.02, 159.03; 301/5 R, 16, 31; 157/1, 3, 13; 144/3 G, 288 A; 474/141, 195, 901

[56] References Cited

U.S. PATENT DOCUMENTS

| | | | |
|---|---|---|---|
| Re. 21,490 | 6/1940 | Lobdell, Jr. ........................ | 29/159.1 |
| 518,691 | 4/1894 | Grauert ...................... | 29/159.02 UX |
| 1,466,179 | 8/1923 | McEwen ........................ | 157/1.36 X |
| 1,949,501 | 3/1934 | Thacher .......................... | 144/288 A |
| 2,035,802 | 3/1936 | George .................................. | 157/13 |
| 2,065,448 | 12/1936 | George .................................. | 157/13 |
| 2,227,220 | 12/1940 | Gray .............................. | 144/288 A |
| 2,256,814 | 9/1941 | Peterson .......................... | 144/288 A |
| 2,264,639 | 12/1941 | Peterson .......................... | 144/288 A |
| 2,375,171 | 5/1945 | Torrey ............................ | 144/288 A |
| 3,080,899 | 3/1963 | Robertson ........................ | 157/13 X |
| 3,965,959 | 6/1976 | Weir ..................................... | 157/13 |

Primary Examiner—Lowell A. Larson

[57] ABSTRACT

Used and/or scrap pneumatic tires may be used for making wheels and pulleys for low speed, low load and low cost applications, the bead of the tires being utilized as the means mounting the tire, the bead being deformed to a generally polygonal shape. When plates are substituted for spokes on the wheels, low cost tumblers are produced.

15 Claims, 10 Drawing Figures

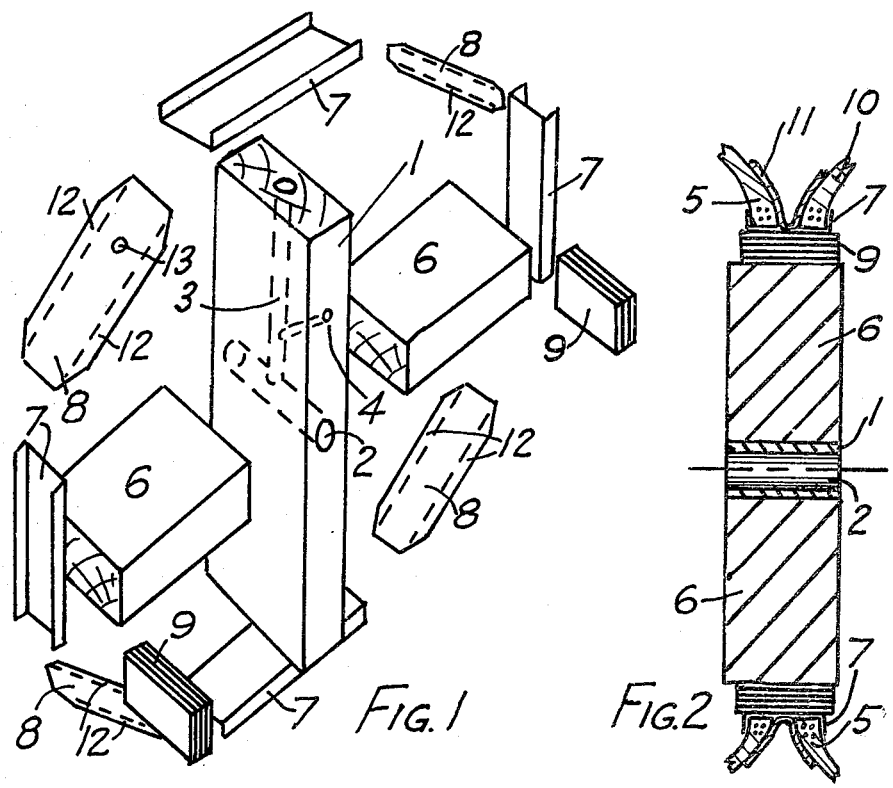
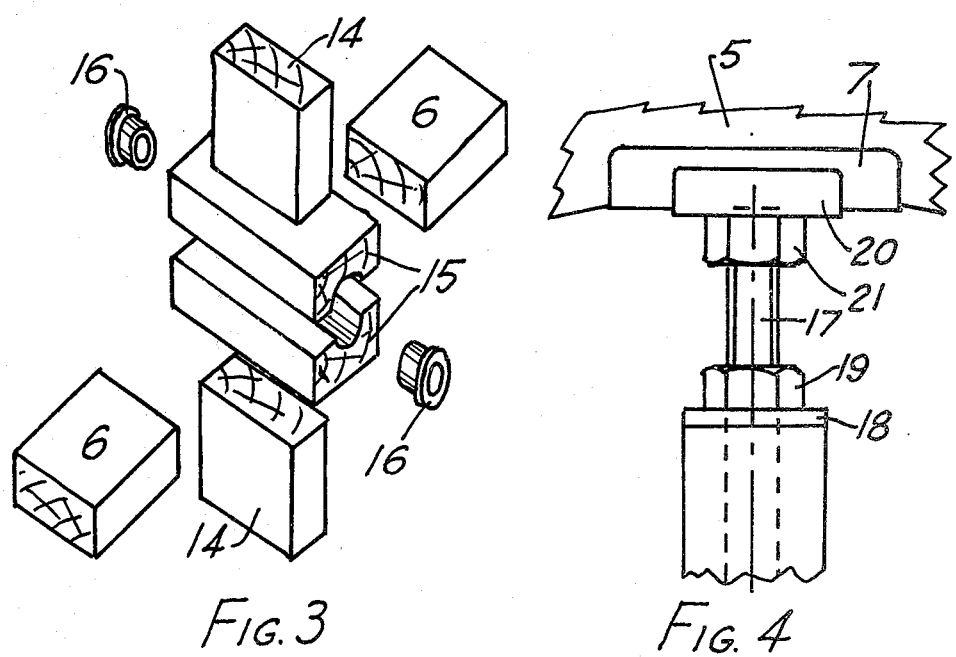

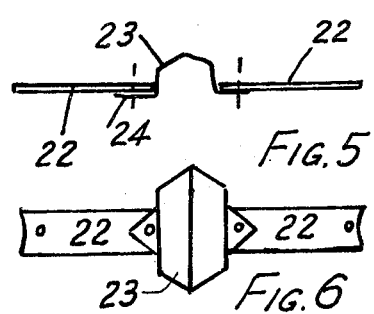
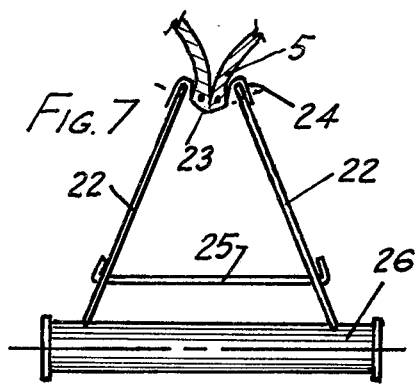
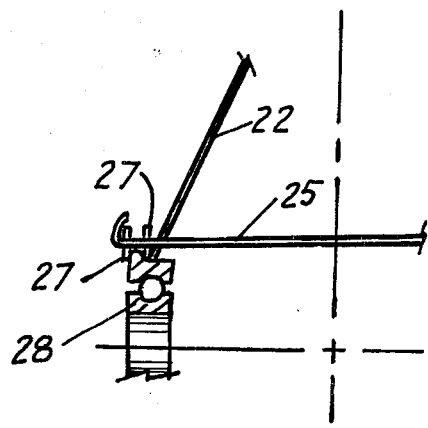
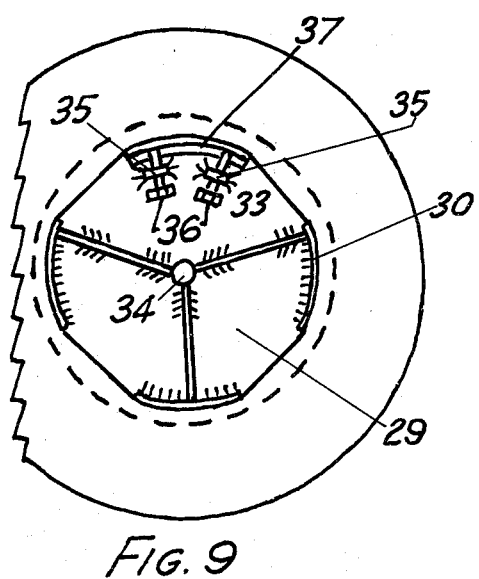
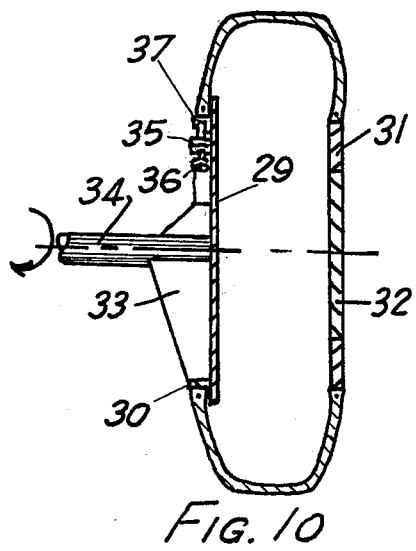

METHOD OF MAKING WHEELS, PULLEYS AND TUMBLERS

The present invention relates to wheels, pulley wheels and tumbling chambers.

The object of the present invention is to provide low cost, low speed wheels, pulleys or tumbling chambers from used tyres. By means of the present invention, and using the coils of high tensile wire built into all pneumatic tire beads, used tyres, with or without tubes, may be used to make durable wheels for carts and vehicles operating at low speeds and at low loads, such as wheelbarrows, oxcarts and the like, and to make pulleys for either flat or Vee belts or rope.

In addition to using used tires, the wheels of the present invention may be simply manufactured using hand tools.

Accordingly, the present invention provides a method of forming a wheel or pulley comprising inserting spoke means generally radially of the beads of a pneumatic tyre casing to deform the beads to a generally polygonal form. The polygonal form is preferably four or more sided, but may comprise only three sides. The invention also includes the wheel or pulley so formed.

Preferably the method includes the step of locating a number of channel members to each locate therewithin the two beads of the casing and to restrict those beads against axial movement. The spoke means preferably bears on the channel members. Flat rectangular pieces may be similarly located, but need not be borne upon by the spoke means. However, it may be desirable for their ends to be captured under the channel members. The use of the flat pieces can effectively double the number of sides of said polygonal form.

In one embodiment, the spoke means comprises a diametrically extending member which deforms the beads and a number of spokes which bear on the diametric member and which also deform the beads. An axle hole or bearing means may be provided in or on said diametric member.

In another embodiment, the spoke means comprises a number of spokes, each of which bears on a hub member and which deform the beads as aforesaid. One or more of the spokes may be made so that the length thereof may be increased.

Wedging or packing means may be hammered in to force the spoke means to deform the beads. Alternatively the beads may be deformed by a screw jack or in some other way to obviate the need for wedging or packing means.

In another embodiment of the invention, the spoke means comprises two longitudinal members which are joined each at one end by a 'top hat' section having longitudinal members joined thereto at the 'brim' portion. In use, the beads are located in the top hat section and the other ends are caused to be moved together and to bear on an abutment so as to produce a force tending to produce a generally polygonal bead form. The longitudinal members may be held together by a tension member. The abutment on which the longitudinal members bear may be a hub member.

For light loads where the wheel is not loaded and stationary for long periods, e.g. overnight, it is not necessary to have a tube within the tyre. However, where a tube is used and where it is likely to be punctured, i.e. where the tyre is worn to the extent that the casing fabric is showing, or for other reasons, it is part of the invention to overcome the problem of having to knock the wheel apart to enable repair of a puncture, in either of the following ways:

(a) Using channel sections on the outer ends of the spoke means where the axial width of the channel is greater than the length but without the flat rectangular pieces between the channel sections so that a suitable sized inflatable sausage-like tube can be inserted into the wheel after it has been assembled. The length of this tube is preferably just greater than the mean of the bead circumference and the outer circumference of the tire. The sausage-like tube can be prevented from bulging between the beads of the tire and the ends of the channel sections by suitably shaped channel sections with padding on the inside to prevent damage to the tube inserted between the ends of the channel sections so that the pressure from the tube, when it is inflated, holds them in position. A normal rubber toroidal tube can be cut and the ends sealed, or plastic tubing, heat sealed, can be used for the sausage-like tube.

(b) The tire can be mounted on only one of the two beads, another bead cut from a used tire of the same size being placed beside this bead for heavy duty conditions, the other free bead being then moved axially to allow the normal toroidal tube to be inserted or removed. In this case the tube can be prevented from bulging between the tire beads by using a liner made from a strip of suitable material with a hole to clear the tube valve stem near each end. The distance between the holes is equal to the internal circumference of the tire. The axial movement of the 'free' bead can be restrained by channel sections fitted between the spoke ends, made so that one flange of the channel is positioned outside the mounted or taut bead and the other flange fits outside the 'free' bead. The channel sections are prevented from moving radially inwards by a radial compression spoke, these spokes being easily knocked axially allowing the channel sections to move radially inwards thereby allowing the 'free' bead to be moved axially thus giving access to the tube while the load carrying spokes hold the wheel together.

In yet another embodiment of the invention, where the bulk of a car tire is a disadvantage, as in a wheel for a child's cart, only the bead or beads and the adjacent rubber and cord of the tire are used to form the rim or rolling contact surface of the wheel. After assembly of the compression spokes to deform the bead or beads to the polygonal shape, the outer circumference can be trimmed until it is nominally circular. Alternatively, any suitable member, strong in tension, e.g. a strip of metal joined at the ends, may be used as a substitute for the beads from the tyre.

In still another embodiment, where the outside diameter of a car tyre is too large for the pulley required, and where a rope or Vee belt is to be used, two beads mounted side by side in the same relative position to that of a tyre with the beads pushed together, makes a crude but effective pulley when the spokes are assembled as described for the wheels.

In order that the invention may be more clearly understood, reference will now be made to the accompanying drawings wherein:

FIG. 1 is a perspective view of means usable with a tire to form a wheel;

FIG. 2 is a cross-section of the means of FIG. 1 used with a tire;

FIG. 3 is a perspective view of alternative means to that of FIG. 1;

FIG. 4 shows the end of an adjustable length spoke;

FIG. 5 is an elevation of another means of making spokes usable with a tyre to form a wheel;

FIG. 6 is a plan view of the means of FIG. 5;

FIG. 7 is a part cross-section of a wheel using the spokes of FIGS. 5 and 6;

FIG. 8 is a view similar to FIG. 7 using an anti-friction bearing;

FIG. 9 is a perspective view showing use of a tire, mounted according to the present invention, as a tumbler; and FIG. 10 is a cross-section of FIG. 9.

The means shown in FIG. 1 comprises a diametric spoke 1 of wood (or any other suitable material which is strong in compression) provided with an axle hole 2 and an oil entry duct 3 closed by stopper. The means includes two other spokes 6, four metal channels 7, four strips of metal 8 and packing pieces 9. To assemble, the diametric spoke 1 is located to bear on two channels 7 which in turn capture the beads 5 of a tire 10 fitted with a tube 11. This makes the beads oval. The strips 8 are located about the beads. The other spokes 6 with their associated channels 7 are located at right angles to the spoke 1 and the packing pieces 9 hammered in to give a generally polygonal form to the tire bead. The form of the tire bead does not materially affect the running surface of the tire.

The edges 12 of the strips 8 are then hammered over the tyre beads to provide a shape strong in bending so that the tube cannot protrude between the beads. The ends of the strips 8 are themselves captured under the channels 7. A hole 13 for the valve of the tube is provided.

Suitable flat members may be used in lieu of the channels 7 if there is sufficient radial load to prevent them being displaced.

The means of FIG. 3 is somewhat similar to FIG. 1 and like numerals denote like parts. The means of FIG. 3 is similarly used with channels such as 7, strips 8 and packing pieces 9 of FIG. 1.

However the spoke 1 is replaced by spokes 14 and a split hub member 15 may be provided with a collet, bush or bearings 16, but a wooden bearing is the lowest cost option. The external shape of the hub member corresponds to the number of spokes used, e.g. hexagonal for six spokes, or as shown, square for four spokes, the flat surfaces of the hub receiving the spokes readily. When the wheel is used as a pulley, the hub is clamped to the shaft by the high compressive load in the spokes.

Packing pieces 9 are not required and all the spokes 6 and 14 are of equal length if a fixture is made to distort the beads to the required shape by other means, e.g. by using a screw jack on opposing channel sections 7. Alternatively, one or more of the spokes may be of adjustable length, one form of adjustment being shown in FIG. 4. A threaded rod 17 extends outwardly of a spoke through a washer 18 and nut 19 adjacent thereto, the end of the rod being caught in a hole in channel member 20, the adjacent nut 21 being held stationary on the rod. As the nut 19 is turned in the correct direction, the rod 17 is made to move radially outward thus forcing the nut 21 against the channel members 20 and 7 thereby distorting the bead 5 into the polygonal shape. The exposed thread may be greased and covered to prevent corrosion. By turning the nut 19 in the reverse direction, the compressive load in the spokes is removed allowing the wheel to be disassembled.

Any material strong in compression is appropriate for use as spokes, e.g. corrugated ripple iron, reinforced concrete, end grain wood, bamboo or the like.

The means of FIGS. 5 and 6 comprises two metal strips 22 secured to 'top hat' section 23 at the 'brim' 24 thereof. FIG. 7 shows use of these means with the beads 5 of a tire captured by section 23, strips 22 held together by a tension member 25 to bear on hub member 26 the inner ends of strips 22 (strong in compression) are caused to move together so as to distort the wires in the tire beads into a pologonal shape. If desired, a suitable gasket (not shown) may be used to seal between the beads to form a tubeless tire, a filler tube or valve being provided for inflation purposes.

In an alternative embodiment (not shown), a tapered square hub driven or pressed into four spokes with a corresponding taper on their inner ends may be used to form the stable polygonal shape.

In FIG. 8, the tension member 25 is held in two washers 27 on each side of the flange on the bearing 28.

In the tumbler shown in FIGS. 9 and 10, the spokes are replaced by a disc 29 having around its circumference a number of ridges 30 adapted to engage one bead of a tire casing, the other bead with its associated opening being closed by a flat plate 31 having a hinged door 32 therein. Gussets 33 allow the disc 29 to be supported on and rotated with the shaft 34. Two nuts 35 are welded to the disc 29, and set screws 36 extend through these nuts to force channel section 37 against the tire bead to thereby deform it to a generally polygonal shape.

I claim:

1. A method of forming a wheel or pulley comprising the steps of:
   a. providing a tyre casing having high tensile strength wires embedded in the beads thereof,
   b. inserting a plurality of spoke means which engage said beads and extend radially inwardly of the casing, the length of said spoke means being such as to stretch and deform the wires in said beads to a generally polygonal form, and
   c. supporting the radially inner ends of said spoke means in such a manner that said spoke means are held in position by the tension in the wires caused by stretching the beads.

2. The method as claimed in claim 1 further including the step of providing a plurality of channel members, the web of each channel member being located inside the bead diameter and the flanges of the channel members being located outside the beads so as to restrict those beads against axial movement.

3. A method as claimed in claim 1 wherein the spoke means bear on the channel members.

4. A method as claimed in claim 1, wherein said spoke means comprise a diametric member which deforms the beads and a number of spokes which bear on said diametric member and also deform the beads, to a polygonal shape.

5. A method as claimed in claim 1, wherein said spoke means comprise a number of spokes each of which bears compressively on a hub member, said spoke means deforming the beads to a polygonal shape.

6. A method as claimed in claim 1 wherein said spoke means comprise a plurality of radially extending members, each strong in compression and each joined at the outer end thereof to a hat-shaped section in which the beads are located, the inner ends of said members being caused to move together while bearing on an abutment, thus causing the beads to be distorted into a polygonal shape, the inner ends being held by a tension member which is generally parallel to the axis of the wheel or pulley.

7. A method as claimed in claim 1 wherein only the bead or beads and the immediately adjacent rubber and cord of the tyre casing are used to form the rim or rolling surface of the wheel or pulley, the outer circumference of said casing being shaped after assembly to be nominally circular.

8. A wheel or pulley comprising:
 (a) a tyre casing having high tensile strength wires embedded in the beads thereof,
 (b) a plurality of spoke means engaging said beads and extending radially inwardly of the casing, said spoke means being in sufficient number and appropriate length so as to stretch and deform the wires in said bead to a generally polygonal form and
 (c) means for supporting the radially inner ends of said spoke means, said supporting means such that said spoke means are held in position by the tension in the wires caused by stretching the beads or bead.

9. The wheel or pulley as claimed in claim 8 further including a plurality of channel members, the web of each channel member being located inside the bead diameter and the flanges of the channel members being located outside the beads so as to restrict those beads against axial movement.

10. The wheel or pulley as claimed in claim 9 wherein the spoke means bear on the channel members.

11. The wheel or pulley as claimed in claim 8, wherein said spoke means comprise a diametric member which deforms the beads and a number of spokes which bear on said diametric member and also deform the beads.

12. The wheel or pulley as claimed in claim 8, wherein said spoke means comprise a number of spokes each of which bears compressively on a hub member, said spoke means deforming the beads to a polygonal shape.

13. The wheel or pulley as claimed in claim 8 wherein said spoke means comprise a plurality of radially extending members, each strong in compression and each joined at the outer end thereof to a hat shaped section in which the beads are located, the inner ends of said members being caused to move together while bearing on an abutment thus causing the beads to be distorted into a polygonal shape, said inner ends being held by a tension member which is generally parallel to the axis of the wheel or pulley.

14. The wheel or pulley as claimed in claim 8 wherein only the bead or beads and the immediately adjacent rubber and cord of the tyre casing are used to form the rim or rolling surface of the wheel or pulley, the outer circumference of said casing being shaped after assembly to be nominally circular.

15. A tumbler or tumbling chamber comprising;
 (a) a tyre casing having high tensile stength wires embedded in the beads thereof,
 (b) a disc having suitable, circumferentially spaced ridges engaging one bead of the tyre casing, one or more ridges being extendable radially outwards causing the said tyre bead, and the wires in the bead, to be distorted into a generally pologonal shape while maintaining the centre of the polygon formed by the bead nominally on the axis of rotation,
 (c) means for operatively connecting said disc to a shaft for rotation therewith, and
 (d) the other bead with its associated opening being closed by a hinged door to form a hollow chamber.

* * * * *